UNITED STATES PATENT OFFICE.

FREDERICK A. GOECKELER, OF WORCESTER, MASSACHUSETTS.

METHOD OF TREATING MANURE.

No. 874,326.

Specification of Letters Patent.

Patented Dec. 17, 1907.

Application filed March 18, 1907. Serial No. 362,804.

*To all whom it may concern:*

Be it known that I, FREDERICK A. GOECKELER, a citizen of the United States, residing at Worcester, in the county of Worcester and State of Massachusetts, have invented a new and useful Method of Treating Manure, of which the following is a specification.

It is well known that sulfuric acid can be used for the purpose of fixing ammonia in many organic substances, and that advantage of this has been taken for the purpose of preparing fertilizers from blood, tankage, offal, and other substances. The sulfuric acid, however, has not performed its function in a complete manner when applied to substances like fresh manure in which the ammonia readily volatilizes.

The principal object of this invention is to provide for treating the latter substance not for the purpose of converting it into a fertilizer in the ordinary sense of the word, but for the purpose of thoroughly deodorizing it and fixing the ammonia and salts which it contains in such a manner that it can be left out in the air for long periods of time without any danger of the valuable constituents escaping into the air, and without any danger of the generation of foul odors.

When manure is treated in accordance with this invention smaller quantities of sulfuric acid are required than is the case when fertilizers are made in the above mentioned manner, and also the entire body of ammonia is fixed as is evidenced by the fact that all the odor disappears and the substance is rendered stable to such an extent that even if left out in the air over the winter it can be used for fertilizing. Under these circumstances it will be found not only to have substantially the full strength of the fresh material, but it will serve to increase the fertility of the soil for several years, for unlike the ordinary fertilizers employed, the ammonia and other valuable constituents are not all dissolved and lost during the first season, but they remain in the soil, dissolving and being dissipated slowly for several seasons. I have found by actual experience that soil treated in this manner grows richer each year, and that a worn out soil, especially of the New England States, can be brought up to a high degree of fertility in one or two seasons.

I will now describe my invention more particularly and set forth an example of an efficient way of carrying out the same.

Commercial sulfuric acid is used as has been the case heretofore, but instead of treating the material with it, for the purpose of making fertilizer, it is mixed with water and deposited on the fresh manure. As has been stated the sulfuric acid will fix such ammonia as it comes directly in contact with, aqueous solution, but the sulfuric acid has no capacity of attacking the ammonia which is volatilized and which escapes in the air in the form of noxious fumes, so that if the sulfuric acid alone is employed sufficient quantities must be used to come into contact with and neutralize all the ammonia in the manure.

In order to greatly reduce the amount of acid used and to provide for attacking and neutralizing the gases while, and after, they form, I mix with the sulfuric acid substantially an equal proportion of muriatic acid. The muriatic acid has the property of volatilizing without decomposing, and of retaining acid character while volatilized, consequently, it attacks the ammonia which may be formed, and is much more free to cover a large area than sulfuric acid.

It is to be understood that the sulfuric acid forms the basis of the treatment, but that the use of the muriatic acid carries forward the function of the sulfuric acid and adds other functions herein specified. Moreover, the chlorids which are formed by the muriatic acid have a different degree of solubility than the sulfates. Some of the salts formed therefore will be of a more lasting character than others, and their effect will be produced for a longer period of time for fertilizing the soil, while other salts formed will be more available for fertilizing purposes when first applied to the ground while the seeds are germinating and getting their first start.

As I have stated I prefer to employ about equal quantities by volume of commercial sulfuric and muriatic acid, and in the proportion about one-half pint of the mixed acids to three ordinary water pails of water which forms enough material to treat a cord of manure. If the hydrochloric acid is not used, a larger quantity of sulfuric will be necessary, and even then all of the fumes from the material cannot be destroyed at the first application. In cases in which there is not sufficient ammonia or ammonium compounds in the manure I add the ordinary ammonia solution of the market to the acids in such quantity as may be found desirable.

The mixture is preferably applied by sprinkling it on the manure in a fine spray or simply by throwing it on a dipper-full at a time. If the sulfuric acid alone is employed care must be taken to cover all of the surface of the manure, but if it is mixed with muriatic acid as stated, the desired effect will be produced without any special care of this kind.

It is to be observed that in addition to the improvement in the fertilizing qualities and the duration of the same which has been described, the application of this invention offers means whereby manure may be put on lawns and the like in such a manner as to have the desired effect without generating the disagreeable odors which make that method of fertilizing so objectionable.

In addition to the above mentioned advantage of the use of muriatic acid whether mixed with sulfuric or other acids, or used alone, it will be observed that the chlorid of ammonium formed by the muriatic acid contains about 26% of nitrogen, while the sulfate contains 21%, the sulfate also being two and one-third times more easily soluble than the chlorid. This means a much greater loss by rain and the melting of snow, etc., and therefore of the fertilizing value, when the sulfuric acid is used.

Twenty-six parts of nitrogen in the form of chlorid will have at least as much, and probably a greater, fertilizing efficiency than forty-eight and nine-tenths parts of nitrogen in the form of sulfate. In other words, if chlorid of ammonium is used, over 18% less by weight is required to secure the same fertilizing efficiency if merely the nitrogen content is considered, but about 60% less if the relative solubility of the two compounds is considered. It will be seen therefore that by the use of muriatic acid there is a smaller loss of fertilizing power by rain, drainage, and the like, the assimilation of the nitrogen is surer and safer, and there is available larger percentage of nitrogen.

The use of the muriatic acid is especially valuable where the manure is to be left out over the winter, and where it is used on soils with a surplus of moisture or drainage. However, it is better to combine it with the sulfuric acid in order that the easily soluble sulfate may be present to insure the decomposition of a part of the fertilizer when it is first applied to the ground, so that the vegetation may have the benefit of the fertilization at all stages of its growth. The beneficial results of the muriatic acid can be obtained without its admixture with sulfuric or any other acid, but I prefer to use it in the manner above specified, although the kinds and proportions of acids will be controlled somewhat by the kind and condition of the manure to be treated.

I am aware that the invention can be carried out by the use of acids in different proportions than those specified, without departing from the scope of the invention as expressed in the claims. Therefore, I do not wish to be limited to the proportions and treatment specified, but What I do claim is:—

1. A method of treating manure which consists in applying to it while fresh a mixture containing muriatic and sulfuric acid.

2. A method of treating manure which consists in applying to it while fresh a mixture containing dilute commercial muriatic and sulfuric acids and ammonium salts.

3. The method of treating manure for preserving its fertilizing qualities, and deodorizing it, which consists in applying to it a mixture of acids and water in substantially the proportion of one-half pint of the mixed acids and three pailfuls of water to a cord of manure.

4. The method of treating manure for deodorizing it, which consists in applying to it a mixture in about these proportions, one half pint of a mixture of sulfuric acid and muriatic acid and three pailfuls of water to a cord of manure.

In testimony whereof I have hereunto set my hand, in the presence of two subscribing witnesses.

FREDERICK A. GOECKELER.

Witnesses:
ALBERT E. FAY,
J. ELMER HALL.